Nov. 7, 1950 W. C. ERLER 2,529,247
CLUTCH AND DRIVE MECHANISM FOR IRONING MACHINES
Filed Aug. 27, 1947 4 Sheets-Sheet 1

INVENTOR.
WALTER C. ERLER
BY
M. W. Green
ATTORNEY

Nov. 7, 1950 W. C. ERLER 2,529,247
CLUTCH AND DRIVE MECHANISM FOR IRONING MACHINES
Filed Aug. 27, 1947 4 Sheets-Sheet 2

INVENTOR.
WALTER C. ERLER
BY
M.W. Green
ATTORNEY

Nov. 7, 1950        W. C. ERLER        2,529,247

CLUTCH AND DRIVE MECHANISM FOR IRONING MACHINES

Filed Aug. 27, 1947        4 Sheets-Sheet 3

INVENTOR
WALTER C. ERLER
BY M. W. Green
ATTORNEY

Nov. 7, 1950           W. C. ERLER           2,529,247

CLUTCH AND DRIVE MECHANISM FOR IRONING MACHINES

Filed Aug. 27, 1947           4 Sheets-Sheet 4

INVENTOR.
WALTER C. ERLER
BY
ATTORNEY

Patented Nov. 7, 1950

2,529,247

UNITED STATES PATENT OFFICE 2,529,247

CLUTCH AND DRIVE MECHANISM FOR IRONING MACHINES

Walter C. Erler, South Bend, Ind., assignor to Bendix Home Appliances, Inc., South Bend, Ind., a corporation of Delaware Application August 27, 1947, Serial No. 770,814

1 Claim. (Cl. 192—25)

This invention relates to intermittent clutch and drive mechanism for ironing machines and the mechanism comprising an embodiment of the invention herein disclosed is an addition to the mechanism disclosed in co-opending application Serial Number 587,315, filed April 9, 1945, in the name of Arthur R. Constantine which produces an intermittent drive to produce limited rotation of a shaft for moving the shoe of an ironing machine toward the roll.

In that mechanism a so-called pin clutch connection is disclosed, with the pin effecting the clutch connection extending through an eccentric or cam for shoe actuation, the pin being slidable into notches in a rotated driving member. In order to actuate the mechanism to produce a cam rotation of 180 degrees, the pin is engaged by a member which pushes it into driving contact with the notched driving member.

However, the disengagement of the pin from the notched driving mechanism requires special consideration since the force for removing the pin is generated by the rotation of the driven member which instantly stops its rotation upon the withdrawal of the pin from the notch in the driving member. Thus there is no power remaining to pull the pin farther from the notch than the position it occupies immediately after it leaves contact with the notched member. Thus if special provision is not made the pin is left projecting so close to the notched member that upon rotation it may strike or grate against the notched member, thus causing noise and unnecessary wear.

It is therefore the primary object of this invention to provide means to effect the positive withdrawal of a connecting pin to a sufficient distance away from a notched driving member to prevent further contact of the pin with the notched driving member.

It is another object to provide additional impetus to a pin to withdraw it from a notch after the initial force imparted to the pin by the rotation of a driven member has become ineffective.

Still a further object of this invention is to provide a pin-clutch connection with a minimum of noise and wear caused by unnecessary contact of the pin with the moving parts therein.

The above and other objects and features of this invention will appear more fully from the following more detailed description and by reference to the accompanying drawings forming a part hereof and wherein.

Figure 8:
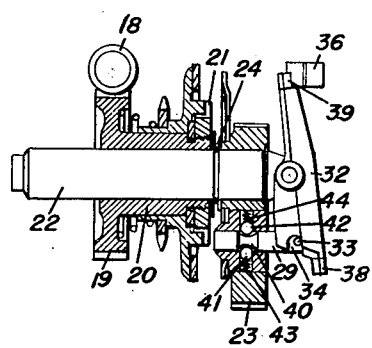
Figure 9:
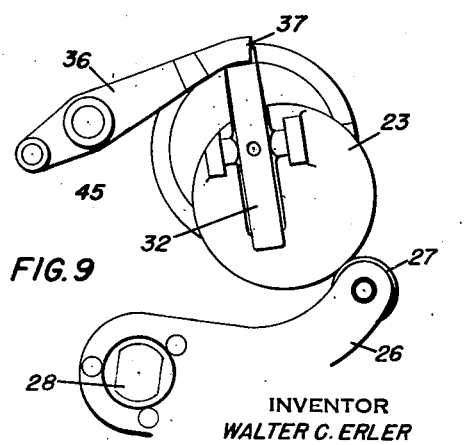

Figures 8 and 9 are views similar to Figures 4 and 5 and 6 and 7, but illustrate the position of the mechanism when the shoe has been moved to a position contacting the roll.

Figure 10:
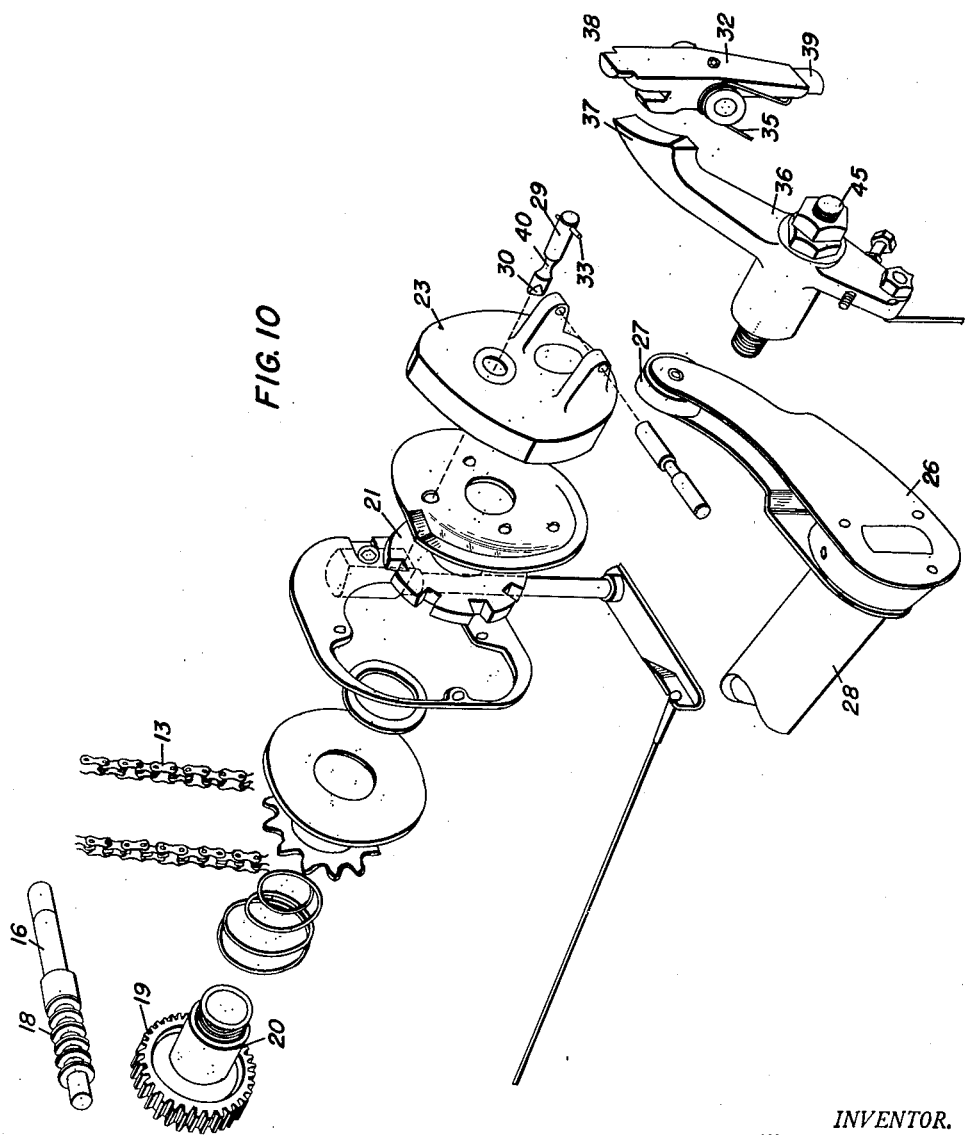

Figure 10 is an exploded view of the clutch mechanism showing the parts of which it is comprised.

Figure 1:
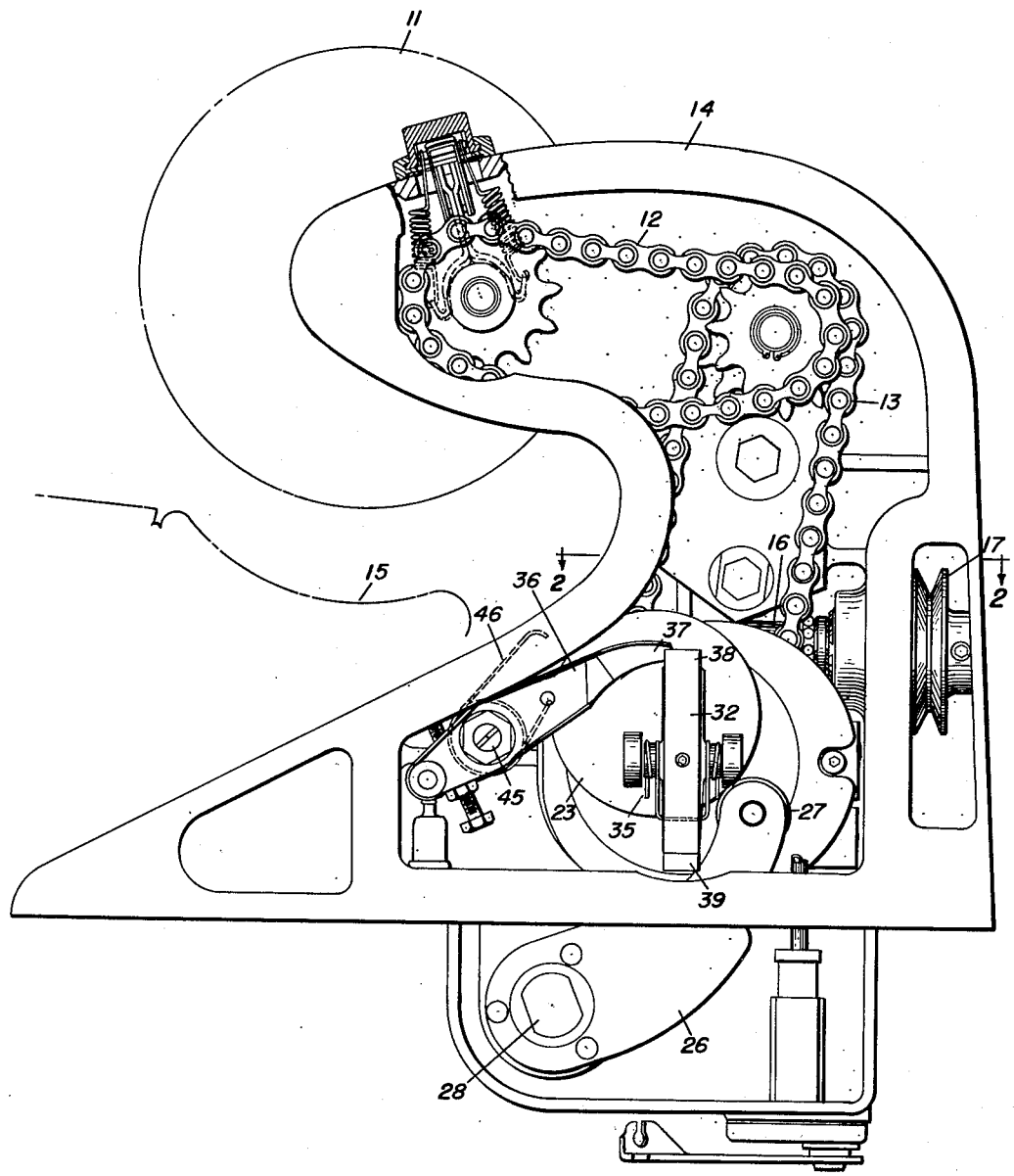
Figure 1 is an end view of an ironing machine with the plate removed to show the driving mechanism thereof.

This invention is adapted to be used in combination with an ironing machine of the general type illustrated in Figure 1 of the drawings in which a rotatable padded roll 11 is supported and driven from one end, with end support for the roll 11 and housing for drive chains 12 and 13 which transmit power to the roll 11 being afforded by the casting 14.

Figure 2:
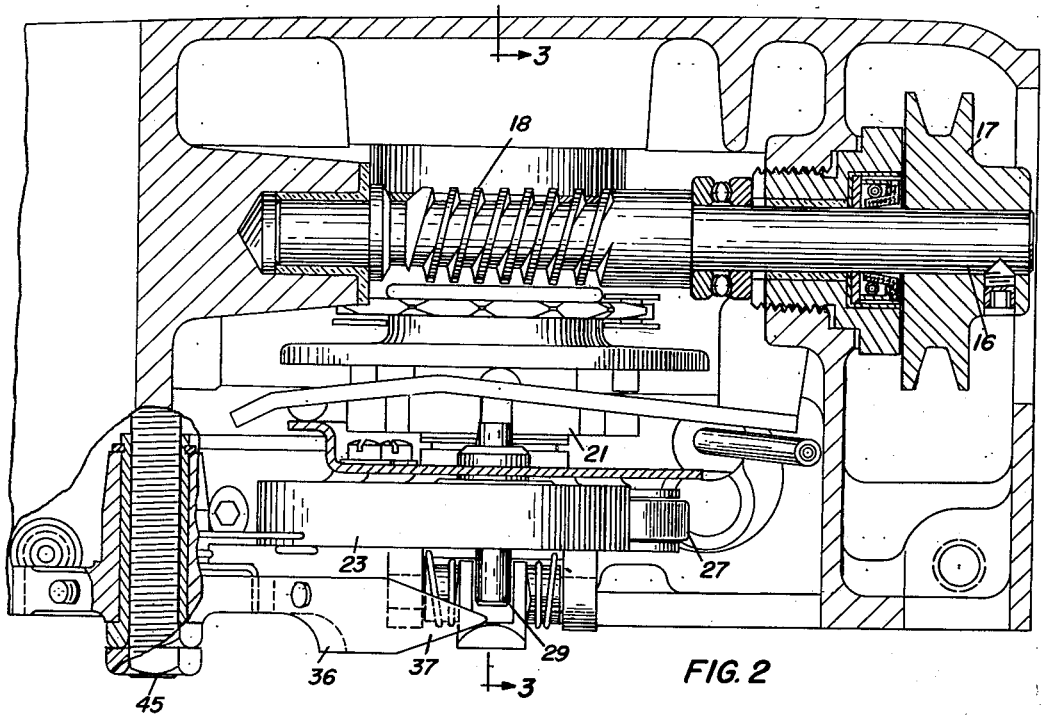
Figure 2 is a sectional view of the clutch mechanism, taken on the line 2—2 of Figure 1.

Power for rotating the roll 11 and also for moving a shoe and table assembly 15 to and from an ironing position with respect to the roll 11 is provided through a shaft 16 driven by a pulley 17. As shown in Figure 2, a portion of the shaft 16 is threaded to form a worm 18 which turns a worm wheel 19 shown in Figure 3. The worm wheel 19 carries a hub portion 20, with the worm wheel 19 and hub 20 forming an integral unit, to the end of which is secured a notched clutch driving member 21. The worm wheel 19 and hub 20 are mounted for rotation upon a shaft 22, so that when the worm 18 is driven from the source of power the worm wheel 19 and the attached notched clutch driving member 21 are also rotated, and therefore the notched clutch driving member 21 is rotating at all times that the driving motor is in operation.

Figure 3:
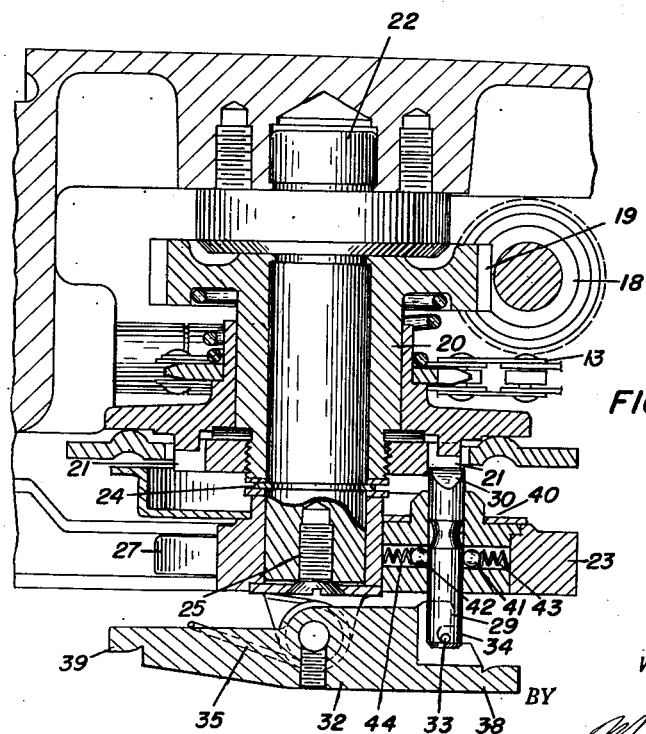
Figure 3 is a sectional view of the clutch mechanism taken on line 3—3 of Figure 2.

Also carried on the shaft 22 is a cam member 23 which is free to rotate on the shaft 22 but which is prevented from axial movement by a snap ring 24 held in place between washers as shown in Figure 3, and the head of the retaining screw 25 which fits into the end of the shaft 22 also shown in Figure 3. The cam 23 is eccentric to the shaft 22, and the rotation of the cam 23 will oscillate a lever 26, one end of which is provided with a roller 27 which is in continual contact with the edge of the cam 23 as shown in Figures 1, 5, 7, and 9. The opposite end of the lever 26 is connected to a shaft 28 which is the actuating member for the shoe support as disclosed in the co-pending application 587,315 previously mentioned.

Figure 4:
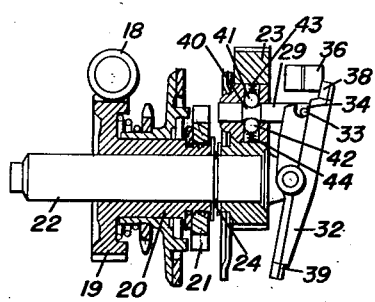
Figures 4 and 5 are a side and end view respectively, partly in section, showing the position of the parts of the drive mechanism when the shoe is away from the roll but is ready to be moved toward the roll.
Figure 5:
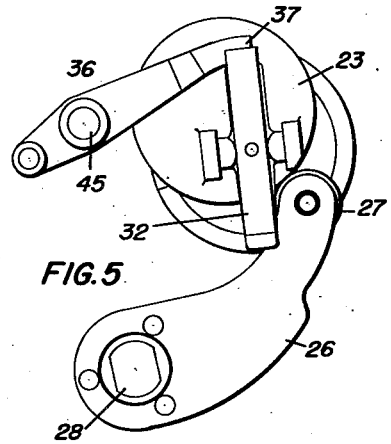

Figures 4 and 5 show the mechanism in a position corresponding to that which locates the ironing shoe 15 in its maximum normal position away from the roll 11 with the cam 23 and the lever 26 remaining stationary. For the purpose of connecting the cam 23 with the notched clutch member 21 a pin 29 extends through the cam 23 at a position to be able to slide into one of the notches of the clutch member 21 on axial movement of the pin 29. This pin 29 is connected to one end of a pivoted lever 32 by insertion of a small cross pin 33 projecting transversely from the larger pin 29 into a slot 34 in the pivoted lever 32, which slot 34 is sufficiently large to allow slight movement of the pin 29 without moving the pivoted lever 32. It can be seen that the end of the pin 29 which fits inside the notched clutch member 21 is provided with a flat tapered portion 30 in order to insure a tight fit of the pin 29 in the clutch member 21 thereby minimizing the possibility of noise that might be caused by movement of the pin 29 inside the slots of the clutch member 21. As shown in Figure 3, the lever 32 is normally urged in a counter-clockwise direction by a spring 35, and thus the pin 29 will normally be engaged with the notched clutch member 21 unless the lever 32 is held against the action of the spring 35.

In order to hold the pin 29 out of engagement and thereby hold the cam 23 in a stationary position as shown in Figures 4 and 5, an actuating arm 36 having chisel shaped end 37 is positioned in the path of normal travel of the ends 38 and 39 of the lever 32 and is so shaped that upon rotation of the cam 23 which rotates with the lever 32, the chisel end 37 of the arm 36 will contact an end 38 of the pivoted lever 32 and by such contact will push the end 38 of the lever 32 in a direction to cause the cross pin 33 to pull the pin 29 out of engagement with one of the notches in the clutch member 21.

It is to be noted that the opposite ends 38 and 39 of the lever 32 are adapted to contact opposite sides of the tapered chisel shaped end 37 of the actuating arm 36, but the result in either case is to pull the pin 29 out of engagement with the clutch member 21. The actuating arm 36 is pivoted upon a pin 45 and is normally urged in a clockwise direction as shown in Figure 1 by a spring 46. However, when the arm 36 is swung upwardly against the action of the spring 46 by means not shown here, a spring 35 will cause the lever 32 to swing in a direction to push the pin into one of the notches of the clutch member 21. In case it is desired to move the cam 23 a half revolution, the actuating arm 36 will be moved away from the end 38 or 39 of the lever 32 which it is then contacting, and when the pin 29 makes contact it will cause the cam 23 to rotate. Then, if the actuating arm 36 is permitted to drop down to its original position by the action of the spring 46, it will then be ready to contact the opposite end of the lever 32 as it swings around at the next 180 degrees of rotation. When the actuating arm 36 contacts the opposite end of the lever 32 it will immediately pull the pin 29 out from contact with the clutch member 21 and stop the rotation of the cam 23. It is apparent, therefore, that unless the actuating arm 36 is pulled out of its normal position, the end 37 of the arm 36 will be in contact within the next 180 degrees of rotation with one of the ends 38 or 39 of the lever 32 and will cause the cam 23 to stop in one or the other of its maximum positions, one of which is shown in Figures 4 and 5 and the other in Figures 8 and 9. It will be noted that the maximum oscillating positions of the lever 26 correspond with the maximum positions of the cam member 23.

Figure 6:
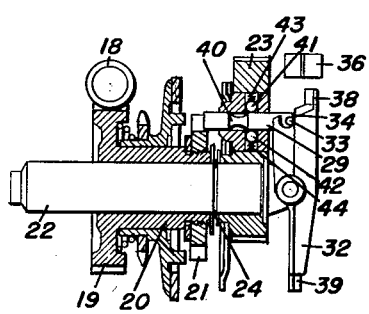
Figures 6 and 7 are views similar to Figures 4 and 5 but show the position of the parts when the controls have been actuated to start the shoe towards the roll.
Figure 7:
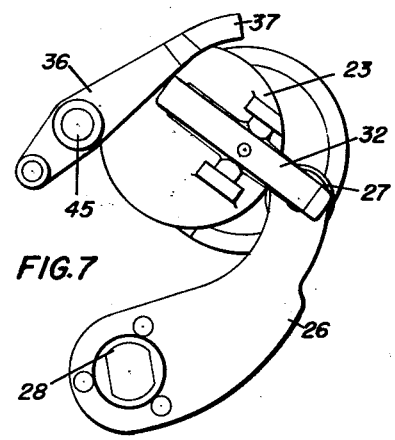

A rounded groove 40 encircles the central portion of the pin 29. In the cam 23 are located small metal balls 41 and 42 which are pressed against the pin 29 by their corresponding springs 43 and 44. When the pin 29 is engaged with one of the notches in the clutch member 21 the balls 41 and 42 are pressing against the pin 29 at a point immediately adjacent to the edge of the groove 40 as is shown in Figure 6. It is apparent that when the chisel end 37 of the actuating arm 36 comes in contact with either end 38 or 39 of the lever 32 and the pin 29 is withdrawn from one of the notches in the clutch driving member 21, the driving force to move the pin 29 would immediately cease upon the withdrawal of the pin 29 from the member 21 were it not for the action of the spring impelled balls 41 and 42. However, after the initial impetus has been given the pin 29 to withdraw it from engagement with the clutch member 21, the balls 41 and 42 are forced into the groove 40, thereby urging the pin 29 further away from the clutch member 21 and eliminating the possibility that the pin 29 may strike or grate against the clutch member 21 and cause unnecessary noise and wear. Figures 4 and 8 show the pin at its maximum distance away from the clutch member 21 with the balls 41 and 42 resting in the groove 40. The springs 43 and 44 which push against the balls 41 and 42 have the necessary resilience to urge the pin 29 by contact with the side of groove 40 and move the end of pin 29 away from the clutch member 21 as described, but they are also of a resiliency such as to be easily compressed to allow the pin 29 to become again engaged with the notched clutch member 21 as shown in Figure 6. As was previously mentioned, the slot or notch 34 in the lever 32 is sufficiently large to permit the further withdrawal of the pin 29 away from the clutch member 21 without necessitating the movement of the lever 32 against the spring 35 any further than it has already been pushed by the actuating arm 36.

Although this clutch and drive mechanism has been described in combination with the particular ironing machine shown in Figure 1, the mechanism is adaptable for use with any ironing machine of the same general type, and it is not intended to limit the scope of this invention by that description or otherwise than by the terms of the appended claim.

I claim:

In a clutch mechanism, a driving member adapted to be mounted upon and to rotate with a shaft, a notched clutch member forming a part of said driving member, a cam member adapted to be mounted for rotation upon said shaft at a point adjacent said notched clutch member, a sliding pin mounted in said cam and capable of being pushed into one of said notches in said clutch member in order to engage said cam with said driving member, a lever pivotally mounted upon the face of said cam, a cross pin extending transversely from the end of said sliding pin, a notch in said lever into which said cross pin on said sliding pin fits forming a loose connection between said sliding pin and said lever in order that movement of said lever will either push said pin into engagement with said clutch member or will withdraw said pin from contact with said clutch member, a portion of said pin shaped to form a groove encircling said sliding pin, spring pressed balls pushing against said sliding pin adjacent to said groove, said spring pressed balls being adapted to cause said pin to be withdrawn further away from said clutch member after the initial withdrawing movement has been imparted to said pin by movement of said lever, said notch in said lever being sufficiently large to allow said further withdrawal of said sliding pin without further movement of said lever.

WALTER C. ERLER.

REFERENCES CITED

The following references are of record in the file of this patent:

UNITED STATES PATENTS

| Number | Name | Date |
|---|---|---|
| 1,133,344 | Walsh | Mar. 30, 1915 |
| 1,935,234 | White | Nov. 14, 1933 |
| 2,045,572 | Dow | June 30, 1936 |